United States Patent [19]

Nevrekar

[11] Patent Number: 5,205,535
[45] Date of Patent: Apr. 27, 1993

[54] EXPANDING GATE VALVE ASSEMBLY

[76] Inventor: Venkatesh R. Nevrekar, 6 Castle Creek Pl., Shawnee, Okla. 74801

[21] Appl. No.: 639,917

[22] Filed: Jan. 10, 1991

Related U.S. Application Data

[63] Continuation-in-part of Ser. No. 437,896, Nov. 17, 1989, abandoned.

[51] Int. Cl.$^5$ .................................................. F16K 3/14
[52] U.S. Cl. ...................................... 251/163; 251/161; 251/194
[58] Field of Search ............... 251/168, 194, 197, 199, 251/204, 187, 198, 161, 163

[56] References Cited

U.S. PATENT DOCUMENTS

| 556,006 | 3/1896 | Fletcher | 251/199 |
|---|---|---|---|
| 750,128 | 1/1904 | Schneider | 251/199 |
| 880,674 | 3/1908 | Ladd | |
| 1,512,431 | 10/1924 | Trowe | |
| 1,949,191 | 2/1934 | Smolensky | 251/161 |
| 1,995,727 | 3/1935 | Wetherbee | 251/203 X |
| 2,039,465 | 5/1936 | Vetrano | 251/199 X |
| 2,612,340 | 9/1952 | Laurent | 251/161 X |
| 3,823,911 | 7/1974 | Natho et al. | 251/167 |
| 4,179,098 | 12/1979 | Laitkep et al. | 251/167 |
| 4,188,014 | 2/1980 | Alvarez | 251/196 |
| 4,188,016 | 2/1980 | Whaley | 251/328 |
| 4,189,127 | 2/1980 | Costantino | 251/196 |
| 4,279,404 | 7/1981 | Levin | 251/167 |
| 4,291,862 | 9/1981 | Alvarez et al. | 257/167 |
| 4,334,666 | 6/1982 | Alvarez et al. | 251/167 |
| 4,341,369 | 7/1982 | Meyer | 251/168 |
| 4,405,113 | 9/1983 | Erwin | 251/168 |
| 4,530,488 | 7/1985 | Kemp | 251/167 |
| 4,531,710 | 7/1985 | Tort | 251/167 |

FOREIGN PATENT DOCUMENTS

| 478810 | 11/1951 | Canada | 251/198 |
|---|---|---|---|
| 1022571 | 3/1966 | United Kingdom | 251/188 |

Primary Examiner—John C. Fox
Attorney, Agent, or Firm—Bill D. McCarthy

[57] ABSTRACT

An expanding gate valve assembly which includes a gate, a stem for actuating the gate, a segment mounted on one side of the gate, or in an alternate, bidirectional embodiment, two segments with one segment movably mounted on each opposite side of the gate for movement toward seating surfaces within the valve body. Each segment carries two spaced, parallel wedging-camming surfaces which are of a configuration to cooperate with complementary spaced, parallel wedging-camming surfaces on the gate to effect lateral expansion of the segment or segments during closure or opening of the valve. The spacing of the wedging-camming surfaces or legs is such that the movable segments are stably supported during their expansion movement.

8 Claims, 3 Drawing Sheets

EXPANDING GATE VALVE ASSEMBLY

RELATED APPLICATIONS

This application is a continuation-in-part of my U.S. patent application Ser. No. 07/437,896, filed on Nov. 17, 1989, entitled "IMPROVED EXPANDING GATE VALVE ASSEMBLY", now abandoned, the details of which are incorporated by reference.

FIELD OF THE INVENTION

This invention relates generally to valves having an expanding valve closure member, and more particularly, to gate valves of the expanding gate type which includes a gate carrying one or more movable segments which move relative to the gate to effect sealed closure of the valve.

BACKGROUND OF THE INVENTION

Brief Description of the Prior Art

Heretofore, many through-conduit gate valve assemblies with expanding gates have comprised a gate having a female V-surface formed in the upstream side of the gate and having a floating segment mounted on the gate, and carrying a complementary male V-surface which engages and coacts with the female V-surface on the gate. The described gate assembly is positioned adjacent seating surfaces within the valve body, and the gate assembly generally moves in a direction perpendicular to the conduit axis (direction of fluid flow through the valve) and parallel to the seating faces. Sealing during opening and closure is effected by the segment being wedged outwardly from the gate in a direction perpendicular to the axis of the stem to effect sealing engagement with the seat faces. Such expanding gate valves may have the gate formed integrally with the stem, or the gate may be connected to the stem with a floating connection, or the gate may be threadedly connected to the stem.

In expanding gate valves of the type described, movement of the gate in a direction normal to the conduit axis brings the floating segment into contact with a stop or other interfering structure which arrests further movement of the segment with the gate in a direction normal to the conduit axis. This causes the segment to be wedged outwardly in a movement of gate expansion, so that the segment is brought into sealing contact with the valve seat. Such expansion of the segment along the conduit axis and substantially perpendicular to the stem axis results from the wedging action of the cooperating V-surfaces carried on the segment and on the gate.

The wedging action causing expanding movement of the segment occurs in the fully closed or the fully opened position of the valve, and, as indicated, results from predetermined, selectively located fixed stops, such as parts of the valve body, which are interposed in the path of movement of the segment as it moves with the gate. These stops arrest further movement of the segment in a direction parallel to the axis of the gate stem. When the gate is moving between the open and the closed positions, the segment is caused to collapse upon, or nest with, the gate as a result of the complementary interfitting of the engaged V-surfaces.

In order for the valve to be smoothly and easily operable, and to avoid damage to the valve stem or gate, it is essential that the wedging action of the gate segments occur in only the open and/or closed positions, and that the segment remain in the collapsed condition when the gate is moving between the open and closed positions within the valve body. This prevents unnecessary dragging or binding of the gate assembly against the valve seat faces at a time when the high integrity sealing is not required. Moreover, any pre-expansion of the segment during travel, also referred to as back-wedging, may result in excessive torque being applied to the stem in order to operate the valve, thereby causing the valve assembly to jam, or even causing twist-off and failure of the stem.

In a gate assembly in which the gate is connected to the stem with a floating connection, for example, with a T-head, both the gate and the segment expand axially along the conduit (fluid flow) axis at the time of closure and opening of the valve. When the gate is of a non-floating type, however, because of a rigid connection between the gate and the stem, only the segment can expand upon closure and opening of the valve. The restraint of the stem prevents the gate from moving in an axial direction.

As a result of such stem restraint, a bending moment is created on the stem in the plane encompassing its axis and the conduit axis (i.e., in the direction of fluid flow). This makes the valve more difficult to operate, and presents the possibility of jamming the valve assembly. When the load on the gate and stem is relieved, the fluid pressure in the conduit, acting on the segment and aided by centralizing levers and/or torsion springs, often employed in expanding gate valves of the type described, forces the segment to nest or collapse into the gate, thus relieving the pressure on the seat faces. The gate assembly can then travel between the position of opening and closing without dragging or binding due to unnecessary contact with the seat faces.

If the fluid pressure in the conduit on the downstream side of the gate assembly (the side opposite the side of the gate which carries the wedge), should build and act with excessive back pressure on the gate, the nesting or collapsing ability of the gate assembly becomes impaired, thereby causing problems as a result of back-wedging or pre-expansion of the segment. The valve consequently becomes very difficult to operate, and in extreme cases, cannot be operated at all.

For the described reasons, the expanding gate valve assembly having a single V-surface on one side of the gate for the accommodation of the V-shaped male protuberance on the wedge is a unidirectional assembly, and can be mounted in the valve body for operation in only one direction of fluid flow. In other words, the wedge must be located on the upstream or high pressure side of the valve gate in order for the gate assembly to function.

In most prior art expanding gate valve assemblies, the V-surfaces formed in the gate, and projecting from the wedge, have generally consisted of two intersecting inclined surfaces forming a single "V", and the "V" has been formed to a location relatively deep in the gate in order that there is adequate contact surface between the intersecting V-surface on the wedge, and the intersecting V-surface on the gate. Such adequate contact surface provides some stability to the wedge as it moves to its sealing position. The necessity for this relatively large surface area of contact between the wedge and the gate at the interacting V-surfaces has made it necessary to make the gate relatively thick in a transverse sense. Such greater gate thickness, of necessity, causes the valve body chamber to be larger, thus resulting in a larger overall valve assembly. This, in turn, results in increased manufacturing cost for the valve.

Expanding gate valves of the type described, having a gate with a movable segment mounted thereon are shown in U.S. Pat. No. 4,189,127; U.S. Pat. No. 4,531,710; U.S. Pat. No. 4,179,009; U.S. Pat. No. 4,188,014; U.S. Pat. No. 4,188,016; U.S. Pat. No. 4,279,404; U.S. Pat. No. 4,341,369; U.S. Pat. No. 4,334,666; U.S. Pat. No. 3,823,911 and U.S. Pat. No. 4,530,488.

In substantially all expanding gate valves as they are presently constructed, the angle $\alpha$ which is included between the V-surface and the axis of the stem (the direction of opening and closing movement of the valve gate) is generally of a magnitude of between about 10° and about 18°. As the magnitude of the angle $\alpha$ is decreased, the ease with which the segment can collapse into the gate following opening and closing is reduced, but a lower operating torque is required to open and close the valve. Conversely, the larger the angle $\alpha$, the more readily and easily the wedge will collapse into the gate following opening and closing of the valve, but a higher operating torque is required in order to open and close the valve. Moreover, the thickness of the valve must be increased in order to accommodate the single V-notch cut to a deeper location within the gate to afford adequate surface area of contact between the wedge and the gate to stabilize and evenly support the wedge in its expanding movement.

A gate valve is disclosed in Trowe U.S. Pat. No. 1,521,531, and this valve includes two axially movable wedge-shaped segments or valve discs which are caused to move outwardly by a threaded shaft which, when turned, causes an upward movement of a wedge nut. This wedge nut can only be accommodated in its upward movement by an upwardly yielding movement of a wedge member. In other words, the wedge nut, as it moves upwardly, carries with it a wedge member. The wedge nut forces this wedge member upwardly along the axis of the threaded shaft, and as the wedge member moves upwardly, the two opposed valve discs are forced outwardly away from the gate.

The only inclined wedging-camming leg or surface present in the structure of the Trowe valve is the interface of each of the valve discs, each of which, the patentee states, is at a slight inclination to the outer face. It is these inclined faces, however, upon which the wedge member acts during the operation of the valve. The threaded shaft is not touched by the inner inclined interface of either valve disc at any time during operation of the valve. In the Trowe structure, there is actually no gate which corresponds to the gate of this present invention, as such gate coacts with movable segments which are moved out against seats. Rather, there is only the threaded shaft which causes the up-and-down movement of the wedge nut which moves upwardly and downwardly along the axis of the threaded shaft. This action by the wedge nut in turn forces the valve discs outwardly into sealing contact with valve seats disposed on opposite sides of the cavity centrally located in the valve body. While it appears that the valve discs are screwed downwardly as the nut and wedge member are moved upwardly, this downward movement of the valve discs on the threaded stem or gate has nothing to do with the concurrent outward movement of the valve discs. This is caused by, and results solely from, the upward movement of the wedge member.

The handle, stem and other operator devices used in the Trowe patent gate valve are also complicated. A first linkage must be initially manually actuated up or down in order to physically displace, by reciprocation, the entire stem, the threaded shaft, the wedge nut, wedges and valve discs. Once they have been moved up or down into a position where this entire assemblange of multiple elements closes the fluid flow passageway across the valve in a gross or general sense, sealing is then next effected by rotation of an elongated valve stem shaft which passes through a collar carried by the manually actuated linkage previously used. There are thus two operators provided in the Trowe valve with these operators being manually manipulated at two different times during the opening, closing and sealing of the valve.

The gate valve shown in Ladd U.S. Pat. No. 880,674 also has a sequentially manipulated compound operator system. A manually operated linkage is first used to move the entire stem up or down, and with it, the multiple part valve mechanism. After this, the elongated valve stem is rotated about its longitudinal axis to set the valve into a sealing mode. Two discs are located on opposite sides of the threaded shaft or rotatable stem, which is itself reciprocated within the valve body. The patentee refers to these discs as "gates". These "gates" are caused to move in a divergent fashion concurrently with the convergence toward each other of a pair of spreading blocks. As these spreading blocks are moved toward each other by the interaction of the two blocks with oppositely pitched threads formed on the rotatable stem, the two wedge blocks, or spreading blocks, force the so-called gates away from each other on opposite sides of the valve cavity. They are ultimately forced into sealing contact with the seats as a result of the movement of the wedge or spreading blocks toward each other.

As the spreading blocks move toward each other, the inclined planes formed by one frustoconical surface on each spreading block forces a gate segment out into sealing contact with a corresponding seat in the valve body. When the stem is rotated in the opposite direction, the spreading or wedging blocks are moved away from each other. This releases the gates which then unseat and allow the entire stem to be reciprocated upwardly within the valve by means of the extra handle or operator first mentioned above. This upward movement continues until two gates and the cooperating spreading blocks are moved upwardly into the bonnet of the valve, and thus clear the fluid flow passageway through the valve. There are thus no segments in the Ladd valve which are forced by moving, inclined, spaced, wedging-camming legs or surfaces carried on the gate or the stem itself so as to move into sealing contact with seats in the valve body.

In U.S. Pat. No. 4,405,113 to Erwin, a reciprocating expandable gate valve is disclosed. This gate valve has a first main stem which moves the entire multiple part gate as a unit in reciprocation upwardly and downwardly with respect to the fluid flow passageway, or stated differently, transversely across the valve body.

The main stem further has coaxially aligned therewith, a cam drive shaft having first and second oppositely threaded sections which function to respectively engage the main stem and a central gate block. The central gate block carries a plurality of cam surfaces thereon. These cam surfaces are contiguous to each other, and they cooperate with seal blocks which also carry cooperating contiguous cam surfaces which interfit with the cam surfaces on the gate block. The seal blocks are moved outwardly as a result of movement of the central gate block, and the coaxial cam drive shaft is moved by rotation of this shaft after the entire valve assembly has been placed across the fluid flow passageway. The cam surfaces formed on the gate block consist of a plurality of contiguous saw-tooth indentations or triangular steps in the gate block which cooperate with complementary cam surfaces on the seal blocks. The complicated compound or dual stem structure disclosed in this patent is the mechanism by which the upper central gate block is caused to undergo a reciprocating up-and-down movement within a certain limited range previously established by rotation of the main stem to set the gate into position within the valve body.

The canted planar camming surfaces which are carried on the central gate block of the Erwin patent are arranged in a saw tooth array. Each camming surface is immediately contiguous to an adjacent camming surface, and each is defined as a triangular protuberance which includes an acute angle. There are no spaced wedging-camming surfaces having a substantial intervening surface therebetween, and placing the wedging-camming surfaces at a significant distance from each other. Moreover, there is no obtuse angulation, but there is rather an acute angle, formed between any of the contiguous wedging-camming surfaces carried on the gate block.

There are a pair of well spaced, wedging-camming surfaces carried on the gate and segment in the present invention. Therefore, balancing and two point support of the segments, which are in contact with the spaced wedging-camming surfaces at all times during expansion of the segments, assures that such segments will always seat squarely against the seat after they have been wedged outwardly by the wedging camming surfaces with which they are in contact. In other terms, the segments do not rock or cant during their sealing movement, but rather move smoothly and evenly against the seat.

The spacing of the two parallel wedging-camming surfaces or legs in the present invention is by a distance which is at least ten percent of the distance across the fluid flow passageway through the valve, and which is to be sealed, and such spacing distance is preferably at least a major portion of the distance across such fluid flow passageway. In most applications of the invention, the distance across the fluid flow passageway can also be equated to the inside diametric distance across the annular seating surface positioned within the valve body adjacent the central cavity in the valve body and extending around the fluid flow passageway. Described in yet another way, the wedging-camming surfaces on the gate are spaced from each other by a distance such that, at the time the segment is undergoing expansion, it is moved away from the gate so that its sealing face remains oriented in the same angular attitude relative to the seating surface within the valve body against which it is to seal. This orientation, which remains constant, is usually parallel to that seating surface while the segment is being cammed toward it. This assures that there is uniform sealing pressure on the seating surface by the sealing face of the segment when sealing is effected, and the described spacing of the wedging-camming surfaces assures that the necessary stability is realized to accomplish this.

In contrast, in the Erwin patent, there are a series of contiguous, saw tooth-shaped camming elements, with only an acute angle defined at the intersection of each of these camming surfaces. The outer seal blocks, provided as a part of one embodiment of the valve illustrated in the Erwin patent, will frequently ride upon, and bear primarily on, only one or at most two of these triangular camming surfaces. This is because this camming surface is the highest, and projects out further than the others. This relationship will frequently occur simply due to the difficulty of machining precisely identical mating saw-tooth surfaces (of the type shown in the Erwin patent) over all of the gate, and cooperating equally with all the seal block camming surfaces. The seal blocks consequently will frequently ride on, and bear primarily upon, only a single one of the camming surfaces which is higher (that is, projects out further) than the others. It is simply not possible, because of manufacturing tolerances, to predict or reckon which of the triangular wedge teeth will protrude out slightly further than the others. Thus, there will be an unpredictable rocking movement of the gate in relation to the seal block due to this very localized support. By contrast, where there are only two of the well spaced wedging-camming surfaces—spaced transverse to the fluid flow axis—as is true of the invention here under consideration, the two spaced wedging-camming surfaces carried on the gate will always be in mating and supporting contact with two wedging-camming surfaces carried on the segment. Any slight shifting of the segment which is required during sealing will still be accommodated by the two, spaced, parallel wedging-camming surfaces as these are formed on the gate. This allows the segment sealing face to be truly self-aligning with the seat, even where the seat is canted or cocked, either by design or due to manufacturing tolerances, or as a result of extended usage.

Danish Patent 50,251 discloses a gate valve in which the gate remains in one position relative to the fluid flow passageway through the valve body at all times during the operation of the valve. Two segments are carried on the gate and these are threaded downwardly by rotation of the gate until the lower ends of these segments strike a pair of inclined surfaces provided on a pair of wedge elements. These wedge elements are secured to the inner side of the valve body, so that once the segments are screwed down at this location, the lower ends of the segments are deflected outwardly by the wedging action of these inclined surfaces. This outward wedging continues until the segments come to bear against the seats located within the valve body on opposite sides of the central valve cavity.

This action is not caused by any structure carried on the gate, but results instead from the segments being canted or cocked sideways as they come in contact with fixed, or non-moving wedge elements projecting inwardly into the valve cavity from the valve body. Further rotation of the helically threaded gate will ultimately cause the tops of these two segments to also be forced out into contact with the seating surfaces at that location within the valve body. The sealing force applied to the two segments is not even or uniform, and the segments do not move so that their sealing surfaces remain parallel to the seating surfaces carried within the valve body. Neither do they seat with the same force at the same time.

The valve shown in the Danish patent causes inordinately high loading on one, or at most two, threads of the threaded cylindrical gate. Due to the pivoting of the segments at their lower end at the time they encounter the inclined surface on the wedge lugs, the lowest thread on the gate will carry a predominance of the load at that time, thereby causing premature failure of the gate thread at this location.

BRIEF DESCRIPTION OF THE PRESENT INVENTION

Broadly described, the present invention is an expanding gate valve assembly which includes a gate, and one or two relatively movable gate segments mounted thereon, so that the gate assembly may be constructed in either a unidirectional or a bidirectional form. The present invention is constructed to eliminate many of the drawbacks of the single V-surface, expanding gate assemblies currently in use and discussed in the preceding section of this application.

In the present invention, the gate may be connected to the stem by either a floating connection, or a threaded connection, or it may be made integrally with the stem. Only a single operator is utilized to move the stem. A principle characteristic of the present invention is that the gate carries two spaced, truncated V-surfaces (wedging-camming surfaces) which are spaced from each other in a direction parallel to the axis of the gate stem and are located on at least one side of the gate. The two spaced truncated V-surfaces provided in one face of the gate mate with correspondingly configured, spaced, truncated V-surfaces carried on the segment which is movably mounted on the side of the gate which carries the truncated V-surfaces. Each segment (whether there be one or two) moves with the gate as the gate moves between a position of valve closure, and a position in which the valve is opened. In most constructions, the two segments, when two are used, will be mirror images of each other, and the valve assembly can be used with fluid flow in either direction. In a few instances, however, it may be desirable to construct the spaced truncated V-surfaces located on the opposite sides of the gate slightly different so that the valve can be used in different types of service by re-orienting the gate within the valve body to present the appropriate side for the service to be accommodated.

It may here be pointed out that two truncated V-surfaces form two pairs of spaced, parallel wedging-camming surfaces, and these terms are used interchangeably.

As in the case of prior types of expanding gate valves, the segments which are provided nest closely with the gate as the gate is reciprocated by the single operator-responsive stem in closing and opening of the valve. The segments expand away from the gate to effect lateral (axial) expansion of the gate assembly, and consequent sealing of the segments against the seat surfaces at the point of opening, or at the point of closure of the valve, and at which times the segments contact stops provided within the valve body to limit the extent to which the segments can continue to move with the gate.

The concurrent, synchronous movement of the gate and segments of the valve of the present invention continues until a stop element arrests movement of the segments and causes interaction of the spaced truncated V-surfaces (wedging-camming surfaces). With the judicious spacing of these wedging-camming surfaces which is utilized, the axial movement of the segment carried on the gate is, at this time, an expanding movement in which the segment moves away from the gate in "a balanced, evenly supported fashion". The segment will not become canted or cocked, because of its support at two spaced locations of the cooperating wedging-camming legs. This spaced two point support affords a stable support for each of the segments, and assures that they move out evenly or uniformly, and generally parallel to the seats against which they are to bear during sealing.

This balanced, evenly supported characteristic of the segment is not accomplished in certain types of expanding gate valve structures disclosed in prior art patents. Examples of these are the Danish patent previously described herein, and Erwin U.S. Pat. No. 4,405,113, also previously described, both of which have segments which are not stably supported during expansion.

The two spaced, truncated V-surfaces or pairs of wedging-camming legs carried on the active face of the gate (i.e. the face which carries the sealing segment—whether it be each face of the gate of the bidirectional valve, or only the upstream face of the gate in the unidirectional valve) has the two relatively widely spaced legs of the truncated V-surfaces located thereon in a judicious location with respect to the flow path of fluid through the valve, and the seat surfaces which surround this flow path. By judicious location is meant that the wedging-camming surfaces are spaced so that the movable segment will be balanced and stably supported at two spaced points in relation to the seating surface, as it moves with respect to the gate. The segment sealing face which is opposite that side of the segment which carries the truncated V-surfaces must remain substantially parallel to the seat against which it seals. The segment will thus not be canted or cocked within the valve body, and will approach and sealingly contact the seat evenly at all points. The judicious spacing which achieves this stability has earlier been defined as a distance of spacing which is at least ten percent of the distance across the fluid flow passageway, and is preferably a major portion of this distance.

The expanding gate valve of the invention can be constructed with the truncated V-surfaces (wedging-camming legs) in several different configurations. In one form, these surfaces and legs extend in a straight line, with each surface lying in a single plane. Alternately, the wedging surfaces can be curved in a vertical plane, or they can be curved in a horizontal plane. They can also be constructed in an ascending or descending helical spiral.

As contrasted with the prior art expanding gate valve assemblies, the present invention, in providing two spaced truncated V-surfaces (rather than, a single, full V-surface) characteristic of the gate, and of the one or more segments carried thereon, can be constructed with a gate which is much narrower in its transverse dimension, and the segments also can be made smaller.

From the foregoing general description of the invention, it will be perceived that an important object of the invention is to provide a expanding gate valve which can be of narrower transverse dimension than prior gate valves, and thus can be made in a more compact form, and at lesser construction cost.

A further object of the invention is to provide an expanding gate valve which uses one or more segments on one or both sides of the gate where the movable segments have improved collapsing ability, and offer less resistance to movement between the valve opened and the valve closed positions.

A further object of the invention is to provide an improved gate valve assembly which can be constructed to reduce the operating torque necessarily applied to the stem during operation; for example, by using two pairs of rollers for wedging-camming surfaces.

An additional object of the invention is to provide an improved gate valve assembly which can be made functional in the bidirectional sense, so that the gate and the segments which are movably carried thereon can be reversed with no resulting difference in the functionality and operation of the valve.

Another object of the invention is to provide an expanding valve which includes a wedging gate and a wedged segment which is caused to move stably and uniformly toward and against a seat within the valve to provide high integrity sealing.

Additional objects and advantages of the invention will become apparent as the following detailed descrition of the invention is read in conjunction with the accompanying drawings which illustrate certain preferred embodiments of the invention.

GENERAL DESCRIPTION OF THE DRAWINGS

FIG. 1 is a diagrammatic representation of a part of a conventional prior art expanding gate valve of the type having a gate mounted on, and movable with, a stem. The gate carries a single upstream movable segment which coacts with the gate through single male-female V-shaped contact surfaces carried on the segment and gate, respectively. In other words, the contact surfaces are immediately adjacent each other. The gate, stem and segment are shown in elevation. The upstream and downstream valve seats located at opposite sides of a central valve cavity are shown in section. The chain dotted lines superimposed on this depiction of the prior art gate valve show how the gate thickness of the valve can be decreased by using a pair of spaced truncated V-surfaces on the gate and on the segment, while nevertheless retaining the same angulation of the coacting wedging surfaces in the case of both the prior art valve and the improved gate valve of this invention. A fluid flow passageway or opening through the gate assembly is shown in dashed lines.

DETAILED DESCRIPTION OF PREFERRED EMBODIMENTS OF THE INVENTION

In the ensuing description of the several embodiments of the invention which are illustrated in the drawings, the diagrammatically illustrated valve seats will generally carry the same reference numerals in each drawing where they are depicted. Such seats will be designated consistently throughout the drawings by reference numeral 10, representing the upstream seat of the valve, and by reference numeral 12 representing the downstream seat of the valve. These seats generally extend around the fluid flow passageway through the valve body in an annular configuration, and in the case of the present invention may even be a part of the valve body.

The valve stem will be denominated by reference numeral 14 where the stem is shown in any of the views of the drawings.

Stop elements which function to arrest the reciprocating movement of the floating segments are most frequently denominated by reference numeral 15.

Another generalization may be extended to each of the several drawings of the application, and will be helpful in understanding how the common inventive principles which characterize the various embodiments are applicable in the case of each of the different embodiments. This generality is that first inclined wedging-camming legs of all of the truncated V-surfaces coact in spaced pairs in each and every illustrated valve to effect closure of the valve at a time when the one or more floating segments of the valve are wedged axially outwardly by such coaction of the upper leg of these V-surfaces. In some embodiments, a second pair of spaced wedging-camming legs of the same truncated V-surfaces also coact with each other so as to cause axial expansion of each valve segment as the valve moves into the open position (in many valves, however, this sealing in the open position of the valve is not required). Each coacting wedging-camming leg of a truncated V-surface in the gate, on the one hand, and on its segment, on the other hand, is parallel to the wedging-camming surface which slides against it during the wedging, expanding action of the valve. It is also true that while any one leg of a truncated V-surface is engaged or loaded, and is undergoing rubbing camming contact during the axial expansion of the movable segment, the other, oppositely inclined leg of that same truncated V-surface in those embodiments where one is provided, is not carrying any load resulting from the operating torque applied to the gate through movement of the stem.

Figure 1:
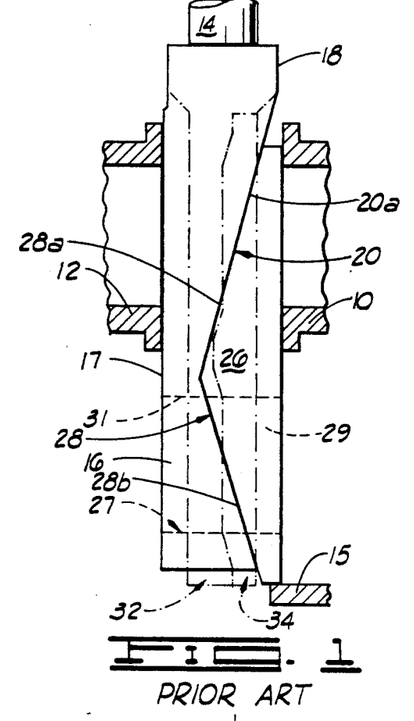

Referring initially to FIG. 1 of the drawings, the prior art expanding gate valve shown there in full lines includes, in addition to the upstream seat 10, the downstream seat 12, the stem 14 and a gate 16 which, in this embodiment, is secured to the stem 14 for movement therewith in a direction normal to the axis of the fluid flow passageway through the valve. The gate 16 has a downstream face 17 and an upstream face 18 which is deeply indented with a female full V-surface designated generally by reference numeral 20. The full V-surface 20 may be thought of as including a pair of long intersecting legs 20a and 20b. These legs 20a and 20b may be thought of as corresponding to much shorter legs which characterize the upstream face of the gate where truncated V-surfaces forming pairs of wedging-camming surfaces are used in accordance with the present invention.

The legs 20a and 20b intersect at an apex or vertex which is sufficiently deeply recessed into the gate 16 with respect to the upstream face 18 of the gate that it is necessary to make the gate relatively thick in order to safely withstand the maximum fluid pressure to which it is subjected during the use of the valve. The leg 20a extends at an angle, α, with respect to a plane which extends parallel to the plane of the axis of the stem 14 and parallel to the monoplanar downstream face 17. The mating V-surfaces are in contact with each other over their entire extent without the necessity for additional bias achieved by the use of spring levers or the like when the valve is operated, but such devices may be used if required.

The movable segment 2 provided in the prior art expanding gate valve construction illustrated in FIG. 1 includes a single male V-surface 28 which has an elongated first leg 28a and an elongated second leg 28b. The male V-surface 28 carried on the segment 26 is complementary in configuration to the female V-surface 20 which is formed in the upstream face 18 of the gate 16. A fluid flow bore 27 through the lower portion of the gate 16 and segment 26 is formed by an opening 29 formed through the segment 26 in alignment with an opening 31 in the lower part of the gate 16.

In the status of the prior art valve illustrated in FIG. 1, the movable segment 26 is shown nested in the gate 16 so that the gate is not axially expanded into firm sealing contact with the valve seats 10 and 12. The segment 26 may, in a few instances, so lightly contact the upstream seat 10 that there is a minor amount of tolerable leakage of fluid which occurs when the gate assembly is in this status. The primary desideratum in this status of the valve, however, is that the segment 26 does not bear against the upstream seat 10 with a force so great that an unacceptably high torque must be applied to the stem 14 in order to cause the gate 16 and segment 26 to move in a direction parallel to the face of the upstream seat 10.

It will be understood that at a time subsequent to the time when the segment 26 is nested in the gate 16, as illustrated in FIG. 1, and after the stem 14 and gate 16 have moved transversely with respect to the seat 10 (say downwardly on the page of drawings), the segment 26 will strike the stop element 15 so that it can no longer move with the gate 16 in a direction transverse to the direction of fluid flow through the valve. The segment 26 will then be caused to undergo an expanding movement as the leg 28a of the male V-surface is wedged outwardly by sliding contact with the cooperating and corresponding V-surface leg 20a of the female V-surface 20 formed in the gate 16.

In this prior art construction, in order to provide adequate assurance that the monoplanar sealing face of the segment 26 continues to move in a plane which remains precisely parallel to the axis of the stem 14, it is necessary that a relatively large expanse of supporting surface be provided by the area of contact between the leg 28a of the male V-surface 28, and the leg 20a of the female V-surface 20. Otherwise, the segment 26 would tend to become cocked or canted as the fluid pressure commenced to increasingly act upon the sealing face of the axially expanding segment in a localized area which was supported on the opposite sides of the segment at some point, but not supported at other points. In order to satisfy this requirement for balanced support of the segment, it is necessary to make the female V-surface of relatively great depth, and therefore to make the expandable gate and segment subassembly relatively thick in a transverse sense. This increases the overall cost of the gate valve, compared to that of the present invention.

In order to facilitate an understanding of the differences which characterize the construction of valves according to the present invention, as compared to the expanding gate valves of the prior art, a unidirectional moving stem embodiment of the present invention is shown in FIG. 1 as it appears when superimposed upon the prior art valve which has been described. The valve of this invention is illustrated in chain dotted lines. The gate is there denominated by reference numeral 32 and the segment, which is movable on the gate, is denominated generally by reference numeral 34. This same valve embodiment constructed according to the present invention is illustrated in solid lines in FIG. 2. From FIG. 1 it can be immediately seen that the expanding gate valve of the present invention can be made much thinner in an axial sense than the prior art gate valve having but a single, large, female V-surface formed in the gate, and a corresponding male V-surface formed on the single segment.

Figure 2:
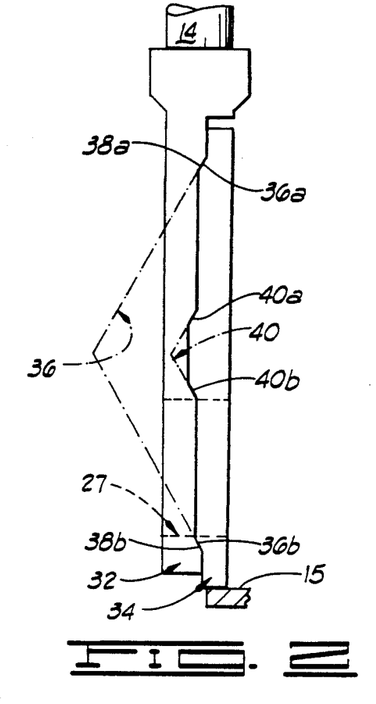
FIG. 2 is a side elevation view of one embodiment of an expanding gate structure constructed in accordance with the present invention, and illustrating how the valve can be made much thinner by using two, spaced truncated V-surfaces, instead of a single complete V-surface as in the prior art constructions. The extent of truncation is emphasized by the use of chain dotted lines to show the magnitude which would characterize the single, full V-surfaces but for the truncation.

An examination of the gate 32 depicted in FIGS. 1 and 2 shows that the gate includes a first imaginary female V-surface 36 which is truncated so as to provide a gate expanding inclined leg 36a and a gate expanding inclined leg 36b which is spaced from the leg 36a in a direction parallel to the axis of the stem 14. The parallel legs 36a and 36b extend parallel to, and coact with, corresponding spaced legs 38a and 38b, respectively, formed on the movable segment 34. The several inclined wedging-camming legs constitute, and are also described as, wedging-camming surfaces.

In order to permit relatively shallow indentations in the gate 32 to be made in order to form the two pairs of short inclined wedging-camming legs 36a and 36b, it is necessary to provide a second truncated V-surface having a pair of inclined wedging-camming legs which will provide additional points of support during the valve opening and valve closing axial expansion movements of the segment 34. Thus, a second female truncated V-surface 40 is provided, and its truncation results in the definition on the face of the gate 32 of a first wedging-camming leg 40a and a second wedging-camming leg 40b.

It may be helpfully pointed out that, with the gate 32 thus constructed to provide the relatively short inclined wedging-camming legs 36a, 36b, 40a and 40b, the gate 32, at its thinnest point, is characterized in having a thickness which is substantially equivalent to the thickness of the gate 16 of the prior art. Yet the overall thickness of the gate is substantially less than the overall thickness of the prior art gate.

During the operation of the unidirectional embodiment of the present invention depicted in FIG. 2, the expandable gate assembly moves up and down in line with the axis of the stem 14, and transversely across the axis of fluid flow through the valve. At a time when the stem is rotated to drive the gate 32 downwardly until the segment 34 contacts the stop element 15 in the lower portion of the valve body, the segment 34, in contacting the stop element 15, is arrested in its movement, whereas the gate can continue to move as the stem is rotated. As the gate 32 moves downwardly relative to the segment 34, the segment is wedged outwardly away from the gate by sliding contact of the male truncated V-surfaces (wedging-camming surfaces) carried on the segment 34 with the wedging-camming surfaces 36a and 40a carried on the gate. The segment 34 will, at this time, be forced into firm sealing contact with the upstream seat 10 and the valve will be closed.

When it is desired to open the valve, the stem 14 is moved in the opposite direction so that the gate 32 is retracted. As soon as the downward force on the gate 32 is lessened or relieved as the stem 14 is moved, the segment 34 can collapse into the position depicted in FIG. 2 in which it fits precisely into the truncated female V-surfaces of the gate. The ease with which the gate 32 and segment 34 can be retracted is now substantially enhanced because the segment no longer presses with sealing pressure against the seat 10.

At the opposite limit of segment travel, an appropriately located stop element (not shown) will arrest movement of the segment 34 with the result that continued movement of the gate 32 will force the segment to axially expand due to the wedging action brought into effect at the spaced, wedging-camming legs 36b and 40b. It will be noted that these particular legs of the truncated V-surfaces 36 and 40 are disposed at a location which is immediately adjacent the opposite sides of the fluid flow port or fluid flow bore 27 through the gate. Thus, the axial movement of the segment 34 away from the gate 32 is accomplished in a balanced, evenly supported fashion, and the segment will not be canted or cocked due to its support at the two spaced points where the wedging legs 36b and 40b are located. The valve is now in a fully open status.

As has been earlier pointed out, it is preferable that the wedging-camming legs 36b and 40b be spaced from each other across the gate (parallel to the axis of the stem) by a distance which is at least 10% of the distance across the fluid flow passageway, and is preferably greater than a major portion of the distance across the fluid flow passageway.

Figure 3:
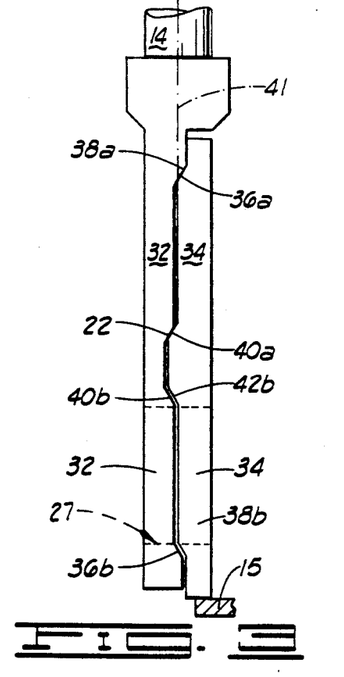
FIG. 3 depicts, in side elevation, an expanding gate valve constructed in accordance with the present invention where the two, spaced, truncated V-surfaces, or pairs of wedging-camming surfaces, provided are disposed on opposite sides of the gate-stem axis. The gate is illustrated as it would appear in the closed position in which one leg of each of the two truncated V-surfaces is engaged with the corresponding respective leg of the truncated V-surfaces formed in the segment. The other leg of each of the truncated V-surfaces are disengaged, and the expanded, sealing condition of the valve is perceptible.

The segment 34 is shown in its expanded, valve closing position in FIG. 3 of the drawings. Here the segment 34 is forced upwardly relative to the gate by the stop element 15.

It should be here pointed out that FIG. 3 of the drawings depicts an exaggerated separation of the segment 34 from the gate 32, which occurs upon the segment's axial expansion away from the gate due to the described wedging action. This has been schematically illustrated by the depiction of a visible space actually separating this segment from the gate except at the locations where the inclined wedging-camming surfaces are in contact, and are coacting with each other to effect the described segment expansion. This wedging action is occurring at the location where wedging-camming legs 36a and 38a are in contact with each other, and at the locations where the spaced wedging-camming legs 40a and 42a are in contact with each other.

It should be understood that in the actual construction and operation of the expanding gate valve of the invention, the space shown between the segment and the gate in FIG. 3 is actually very minute. It is for this reason that in the other drawing Figures, an actual space or gap between the segments and gate used in any particular embodiment of the valve is not illustrated in either the closed or the open position of the valve.

Figure 4:
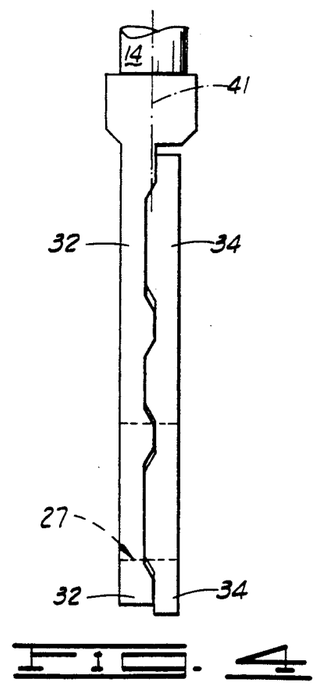
FIG. 4 is a side elevation view similar to FIG. 3 except for its showing of an embodiment of the invention in which all of the spaced, parallel wedging-camming surfaces are located on the gate-stem axis.

FIG. 4 displays an embodiment of the invention which is similar to that which is shown in FIGS. 2 and 3, except that in the FIG. 4 embodiment truncated V-surfaces forming pairs of wedging-camming legs are positioned so that all of the legs of the truncated V-surfaces are aligned along the longitudinal axis 41 of the valve stem 14. This provides the advantage that the vertical component of the wedging force reaction passe through the stem axis, and thus there is no resultant unbalanced movement on the stem.

Figure 5:
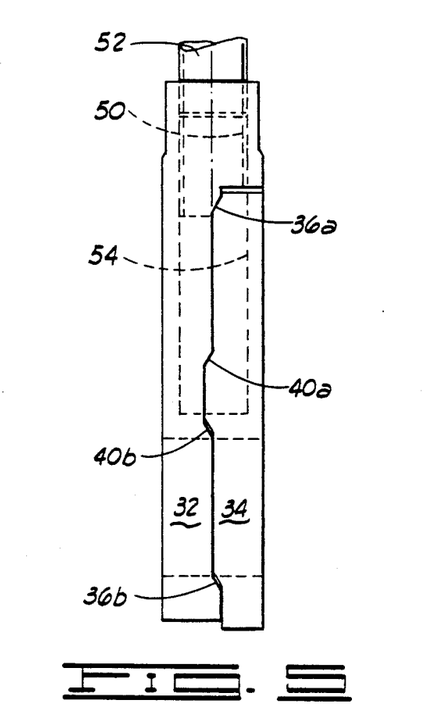
FIG. 5 is identical to FIG. 3 insofar as are concerned the actuation of the segment, and the disposition of the wedging-camming camming surfaces on opposite sides of the gate stem axis, but this figure functions to show the construction of the valve where a non-rising stem is used, and the gate moves up and down on the stem as the stem is rotated.

In FIG. 5, a valve constructed substantially identically to that shown in FIG. 3 is illustrated, except that in the FIG. 5 embodiment, the valve is of a non-rising stem design. Thus, the valve again includes the truncated V-surfaces 36 and 40 which the respective wedging-camming legs 36a and 36b, and 40a and 40b. The valve gate 32 includes a threaded bore 50 for the receipt of a threaded stem 52. The externally threaded stem 52 which is threaded into the internally threaded bore 50 can be rotated to cause the gate to move upwardly and downwardly on the stem, carrying with it the segment 34 until the segment abuts a stop element, in the manner hereinbefore described. This causes the segment to be expanded axially outwardly by the wedging action which occurs between the truncated V-surfaces, and particularly the legs 36b and 40b or the legs 36a and 40a.

In all cases, the movement of a single operator will effectively cause movement of the stem. That is, multiple operators or a plurality of handles are not required for the operation of the valve.

Figure 6:
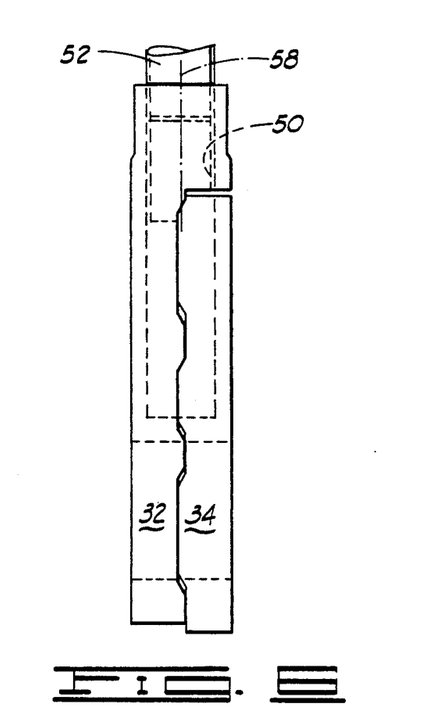
FIG. 6 is a side elevation view similar to FIG. 4, and showing an expanding gate valve which operates upon the same principles, but showing a non-rising stem embodiment of the valve.

FIG. 6 is a view similar to FIG. 5, in the sense of showing a valve of the non-rising stem-type, but this embodiment is also similar to FIG. 4 in showing a valve which has the legs of the several truncated V-surfaces disposed, in every instance, along the axis 58 of the valve stem.

Figure 7:
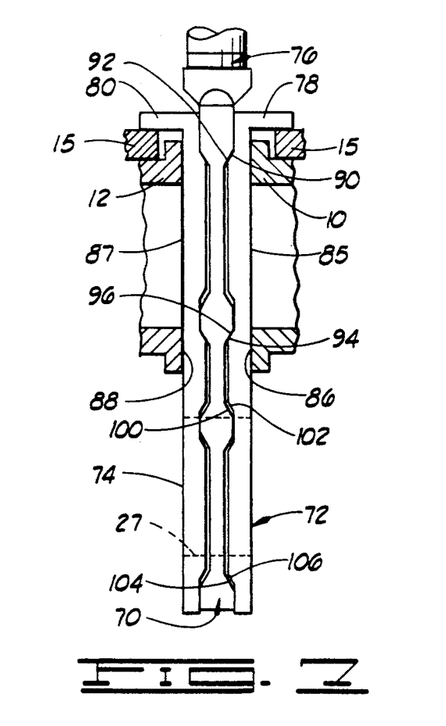
FIG. 7 diagrammatically depicts a bidirectional expanding gate valve assembly in which a single gate carries a movable segment on each of its opposite sides, so that fluid pressure can act in either direction on either of the two segments, and the gate will function to seal in either case. This figure shows this gate assembly in a closed status.

In the bidirectional gate valve assembly shown in FIG. 7, the gate is indicated generally by reference numeral 70, and is shown as carrying an upstream segment, designated generally by reference numeral 72, and a downstream segment designated generally by reference numeral 74. The gate 70 is connected at its upper end to a suitable stem 76. Each of the segments 72 and 74 carries a stop flange at its upper end. The stop flange carried on the wedge 72 is denominated by reference numeral 78, and that which is carried on the wedge 74 is denominated by reference numeral 80. The stop flange 78 is adapted to make contact with the stop element 15 which is connected to, and remains stationary with, the valve body (not shown) during operation of the valve. The stop flange 80 is positioned to make contact with the second stop element 15 which is also secured to, and remains stationary with, the valve body during the operation of the valve.

The upstream valve seat 10 is positioned to make contact with an upstream sealing face 85 of the segment 72 during operation of the valve, and the downstream seat 12 is positioned to make contact with downstream sealing face 87 of the downstream segment 74 during operation of the valve. The two segments 72 and 74 are identical, and can therefore be placed either on the upstream side of the gate 70, or the downstream side thereof. The pressure differential of the fluid can act in either direction across the gate, and can be brought to bear on either segment 72 or segment 74, since the gate segments are identically shaped and coact with gate 70 in the same way.

In FIG. 7, the gate assembly is shown in its closed position as a result of the movement of the gate 70 downwardly (using the page as a reference) and transversely to the direction of the fluid flow until the stop flanges 78 and 80 of the segments 72 and 74, respectively, have contacted the stop elements 15, and therefore cannot continue to move with the gate 70. At this time, the gate 70, in continuing to move downwardly, or transversely through the valve body, as shown in FIG. 7, causes the segments 72 and 74 to be wedged outwardly in an axially expanding movement. This results from the wedging of the wedging-camming leg 90 carried on the gate against the corresponding parallel wedging-camming leg 92 carried on the segment 72 (shown in contact with the leg 90 in FIG. 7). Outward axial wedging movement of the segment 72 is also caused to occur by reason of the wedging action developed between the wedging-camming leg 94 carried on the gate 70 and the leg 96 of a complementary truncated V-surface carried on the segment 72. It will be noted that the wedging-camming leg 90 is relatively widely spaced from the wedging-camming leg 94 along a line which extends parallel to the axis of the stem. It will be further noted that each leg forms an obtuse angle with a surface on the gate 70 which extends parallel to the stem axis. This angle is the complement of the angle α which has previously been discussed. It will also be noted that the cooperating legs 90 and 92 at the upper end of the gate 70 and the legs 94 and 96 are spaced so that the force wedging the segment 72 axially to effect the closure of the valve is preferably distributed uniformly opposite the seat surfaces against which the segment 72 is forced in its sealing movement.

At a time when the bidirectional valve of FIG. 7 is to be opened, the stem 76 is moved upwardly, causing the gate 70 to retract. As soon as this movement commences, the segments 72 and 74 can collapse to a position where they are nested within the recesses formed in the gate 70, and defined between the wedging-camming legs formed therein. This reduces the frictional drag exerted by the segments 72 and 74 against the seating surfaces 86 and 88 of seats 10 and 12, respectively, of the valve, and allows gate-segment movement from the closed to the open position to proceed smoothly and evenly without requiring excessive torque, or placing an unsafe load on the valve stem 76.

When the valve is placed in the open position, the fluid flow bore or passageway 27 through the segments 72 and 74 and through the gate 70 is raised upwardly and placed in alignment with the fluid flow passageway through the valve body and through the two opposed seating surfaces 86 and 88 of seats 10 and 12. At this time, in order to seal the valve in the open position where such is desired, a pair of second stop elements (not shown) which may be located above the stop elements 15 arrest further upward movement of the stop flanges 78 and 80 which then come in contact with these second stops.

Continued upward movement of the gate 70 as a result of movement of the valve stem 76, however, causes the gate to move to the point where a wedging-camming leg 100 of a truncated V-surface contacts, and wedges outwardly, a parallel wedging-camming leg 102 carried on the segment 72. Concurrently, additional wedging is developed by contact of another wedging-camming leg 104 of a truncated V-surface carried on the gate 70 with a corresponding complementary wedging-camming leg 106 carried on the wedge 72. The discussion of the spacing of the parallel, spaced wedging-camming legs or surfaces has been previously discussed and is applicable to these legs. These wedging actions again force the wedge 72 into sealing contact with the upstream seating surface 86 of the valve at a time when the valve is in the open position.

It will be understood, of course, that substantially the same type of coacting leg wedging action will occur in the case of the segment 74 at the same times as the described wedging actions occur in the case of the segment 72.

Figure 8:
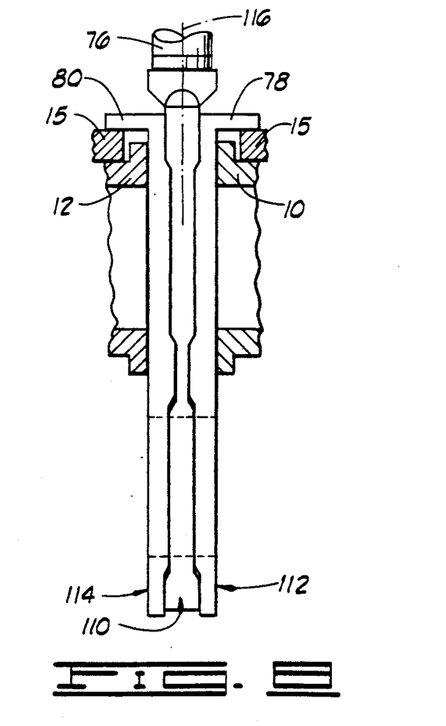
FIG. 8 is a diagrammatical view of another bidirectional embodiment of the expanding gate valve in which the legs of the two truncated V-surfaces are disposed at differing distances from the gate stem axis, as opposed to the arrangement shown in FIG. 7 where the distances of these leg surfaces from the gate stem axis are the same.

In FIG. 8 of the drawings, a gate of the illustrated valve embodiment is denominated by reference numeral 110, a movable upstream segment is designated generally by reference numeral 112, and a movable downstream segment carried on the opposite side of the gate is denominated generally by reference numeral 114. This valve, like the valve shown in FIG. 7, is a bidirectional, expanding gate valve having identical segments 112 and 114 on opposite sides of the gate 110. Here, however, it will be perceived that the two truncated V-surfaces have spaced, parallel wedging-camming legs located at varying distances from the projected stem axis 116. Expansion of the segments 112 and 114 into a position of sealed closure of the valve, as well as a position of sealing during opening of the valve, occurs in the manner which has been explained in the case of FIG. 7.

Figure 9:
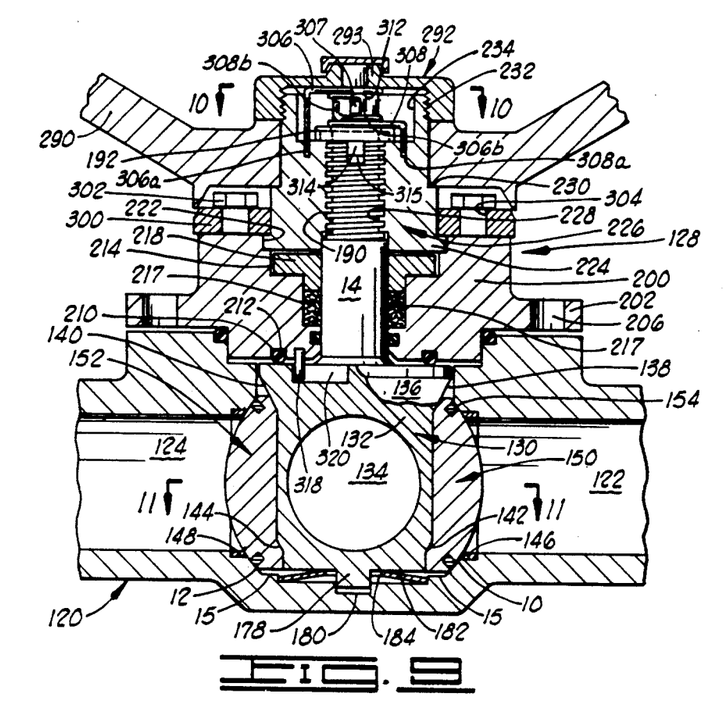
FIG. 9 is a sectional view of a valve body containing a lift-and-turn expanding ball valve mechanism therein which includes a gate and a pair of segments each shaped as a segment of a sphere. The valve stem is illustrated in elevation.
Figure 10:
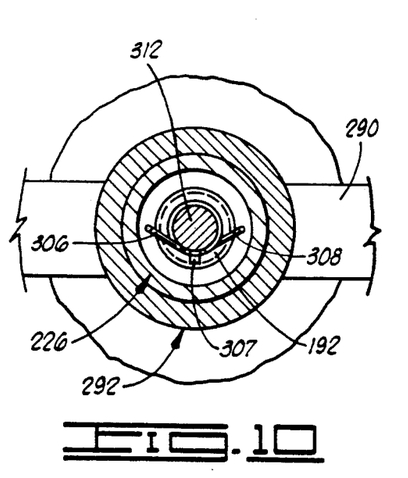
FIG. 10 is a sectional view taken along line 10—10 of FIG. 9.
Figure 11:
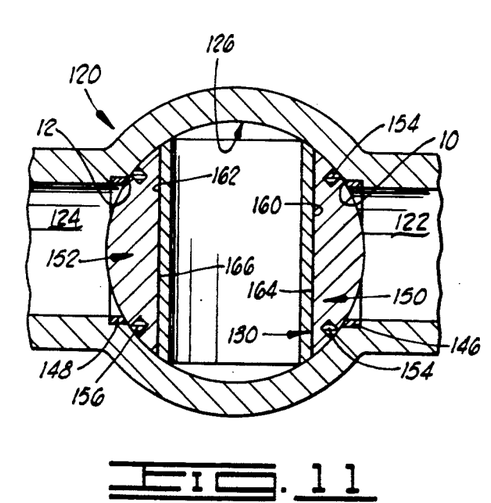
FIG. 11 is a sectional view taken along line 11—11 of FIG. 9.

Another embodiment of valve incorporating the principles of the present invention is illustrated in FIGS. 9, 10 and 11 of the drawings. In this valve, the valve body is designated generally by reference numeral 120. The valve body includes an upstream fluid flow passageway 122 and a downstream fluid flow passageway 124, and the valve body defines a central cavity denominated generally by reference numeral 126 (see FIG. 11). The central cavity 126 is open to the fluid flow passageways 122 and 124, and also opens upwardly through one side of the valve body 120 to communicate with the interior of a bonnet designated generally by reference numeral 128. The valve body 120 carries the annular upstream seat 10 and an annular downstream seat 12 as hereinbefore described.

Within the valve body 120, and more specifically within the cavity 126, a rotary gate structure is located and is denominated generally by reference numeral 130. The gate 130 has a central portion of the gate body 132 which is of generally rectangular parallelepiped configuration having a cylindrical bore 134 formed transversely therethrough in a position to register with the fluid flow passageways 122 and 124 when the valve is open. Additionally, the gate 130 includes a frustoconical upper portion 136 secured to, or preferably formed integrally with, the upper side of the gate body portion 132. The frustoconical upper portion of the gate 130 forms inclined, wedging-camming surfaces 138 and 140 located at opposite sides of the upper portion of the gate—that is, on the upstream side facing the upstream seat 10 of the valve body, and on the downstream side facing the downstream seat 12.

At the lower portion of the gate a pair of inclined wedging-camming surfaces 142 and 144 are provided. The wedging-camming surfaces 142 and 144 extend parallel to the wedging-camming surfaces 138 and 140, respectively, disposed at the upper side of the gate 130. It will be noted in referring to FIG. 9 that the pair of parallel wedging-camming surfaces 138 and 142 are relatively widely spaced from each other so as to be located relatively close to the annular upstream seat 10 and the annular downstream seat 12, which seats extend around the fluid flow passageway 122 and 124 where the fluid passageway enters the central cavity 126 within the valve body. And, as for all of the embodiments described herein, the wedging-camming surfaces 138, 142 and 140, 144 form pairs of wedge surfaces which are not coplanar; that is, each such pair comprises wedging-camming surfaces which are substantially parallel spaced apart wedges.

While still referring to FIG. 9, it will be noted that the upstream seat 10 within the valve body carries an annular sealing element 146 of an elastomeric material suitable for effecting a compression seal at this location. In similar fashion, the downstream seat 12, in addition to the metal surface there provided for a metal-to-metal seal, provides an annular elastomeric sealing element 148 which is retained in a suitable annular recess or groove.

On opposite sides of the gate 130 and facing the upstream seat 10 and the downstream seat 12, respectively, are a pair of floating segments designated generally by reference numerals 150 and 152. In the illustrated embodiment of the invention, each of the segments 150 and 152 is frustospherical in configuration—that is, it is that portion of a sphere which is formed when a plane is passed through one side of a sphere offset from, but parallel to, a diametric plane through the sphere. The outer peripheral surface of each of the floating segments 150 and 152 is formed as a spherical segment or frustospherical surface, and at appropriate locations therealong, mates with a complementary curved surface making up the metal portion of the respective upstream and downstream seats 10 and 12. At this location, it will be noted that the upstream segment 150 carries a radially outwardly projecting sealing ring 154 of elastomeric material. This sealing ring 154 is positioned to bear against a portion of the upstream seat 10 as shown in FIG. 9. In similar fashion, an annular elastomeric sealing element 156 is located at an appropriate sealing location on the downstream floating segment 152.

It may be commented at this point that in a different embodiment of the invention, the floating sealing segments can be made of a frusto-cylindrical configuration, rather than semispherical.

Each of the floating segments 150 and 152 has a gate-contacting side. The gate-contacting side of each of the floating segments includes a flat monoplanar central surface which contacts the central portion of the gate body 132 of the gate. The gate-contacting central surface of the upstream segment 150 is shown in FIG. 11 and there denominated by reference numeral 160. The corresponding gate-contacting surface on the downstream floating segment 152 is denominated by reference numeral 162. The opposed contacting surfaces of the central portion of the gate with which the surfaces 160 and 162 are in contact are denominated by reference numerals 164 and 166, respectively (see FIG. 11).

The segments 150 and 152 will rotate with the gate about an axis which extends normal to the axis of the fluid flow passageways 122 and 124 and parallel to, or coincident with, the axis of the valve stem 14 as hereinafter described. Thus, the gate and floating segment arrangement shown in FIG. 11 is constructed to permit rotation about a central axis so that the cylindrical bore 134 through the gate can be brought into alignment with the fluid flow passageways 122 and 124 during operation of the valve. This rotation moves the frustospherical floating segments 150 and 152 to a position in which they are located 90° from that in which they are shown in FIG. 11. The segments 150 and 152 are free to move reciprocably, however slightly, relative to the gate 130 in a direction parallel to the axis of the valve stem 14 and transverse to the direction of fluid flow through the valve.

It will be noted in referring to FIG. 9 that the gate 130 carries an aligning stub or protuberance 178 which projects from the center of the bottom of the gate 130 into a small receiving cavity or recess 180 of complementary configuration thereto and formed in the valve body at the location illustrated in FIG. 9. The gate is resiliently biased upwardly to the position shown in FIG. 9 by a suitable spring element 182 positioned in a receiving recess 184 formed in the valve body 120 at the illustrated position. It will thus be perceived that the gate 130 is free to move upwardly and downwardly to some extent, which movement is resiliently opposed in one direction by the spring element 182.

Secured to the top of the gate 130 at a central location thereon is the elongated stem 14. The stem 14 carries an external helical thread 190 on an upper end portion of the stem. A dish-shaped top cap 192 is mounted in the valve over the threaded upper end portion of the stem and is upset to permit the upper threaded end portion of the stem to move upwardly into the top cap by a small amount during the operation of the valve as hereinafter described.

The bonnet 128 of the valve includes a central body 200 having an outwardly extending flange 202 which is apertured to facilitate the extension of bolts (not shown) through these apertures and into threaded registering apertures in the valve body 120. The inner side of the bonnet which extends over the opening into the central cavity 126 has an annular recess 210 therein which accommodates a suitable O-ring seal 212. The O-ring seal 212 is compressible, and bears against the upper side of the gate 130 in a manner illustrated in FIG. 9.

The bonnet 128 also has a central opening therethrough for the accommodation of the stem 14, and is provided with a pair of counterbores 214 and 216 of differing diametric dimension. The counterbore 216 which is of the smallest diameter receives a chevron packing 217 which seals against the outer periphery of the stem 14. A packing cap 218 includes a central cylindrical portion which fits around the stem 14, and an outer flange portion which extends out into the counterbore 214. The packing cap 218 functions to retain the packing 217 relative to the bonnet 128 and the stem 14.

The bonnet 128 further includes, at its upper side, an upwardly opening annular cavity or recess 222 which communicates with the counterbore 214 and opens at the upper side of the bonnet as shown in FIG. 9. The cavity or recess 222 receives an annular flange 224 carried at one end of a large nut designated generally by reference numeral 226. The nut 226 has a central bore therethrough which carries an internal thread dimensioned to mate with, and threadedly engage, the threaded upper end portion 190 of the stem 14. Around its outer periphery, the nut 226 carries an annular shoulder 230 intermediate its length. At its upper end, a relatively short external helical thread 232 is provided. Between the thread 232 and the shoulder 230, the nut 226 is of hexagonal external cross-sectional configuration.

The upper end portion of the nut 226 has a large bore 234 formed centrally therein and this bore communicates with the threaded passageway 228 which enables the nut 226 to be threadedly engaged with the threaded upper end portion 190 of the stem 14. The hexagonal external cross-sectional configuration is the means by which the nut 226 is keyed to an operator handle 290 for a purpose hereinafter described.

A closure cap subassembly 292 threadedly engages the external thread 232 on the nut 226, and extends across and closes the bore 234 formed centrally in the upper side of the nut 226. The closure cap subassembly 292 is screwed down on the external threads 232 on the nut until its lower side bears against the upper side of the operator handle 290. The closure cap subassembly 292 includes a central hub 293 which surrounds the upper end of an upper stem segment 312. The upper stem segment 312 rests upon the cap 192 and carries a key 314 which projects into a recess of complementary cross-sectional shape 315 formed in the upper end of the stem 14. Rotation of the stem segment 312 will thus cause rotation of the stem 14 and the gate 130. It will be noted that the recess 315 is of greater depth than the length of the key 314 so that the principal part of the stem can move upwardly a short distance.

The nut 226 is retained in position by an annular plate 300 which extends around the outer side of the packing nut, and is bolted to the bonnet 128 by means of bolts 302 extended through holes 304 in the plate 300 as shown in FIG. 9. The annular plate 300 fits over the flange 224 formed on the lower end of the nut 226 and retains the nut at the illustrated location in the valve assembly.

A pair of oppositely acting torsion springs 306 and 308 are disposed in the bore 234 in the packing nut 226 and form a part of a lift-and-turn mechanism which is employed in the valve. The top torsion spring 306 has an end of a leg portion 306a extended into a receiving recess in the nut 226, and is then bent through 90° and curved through one or more convolutions which encircle the upper stem segment 312. The top torsion spring 306 is then again bent through 90° and ends in a leg portion 306b. A lug 307 which is carried on the stem segment 312 projects into the path of rotation of the leg portion 306b of the spring 306 when the spring is rotated by means of handle 290.

The second or bottom torsion spring 308 has a leg 308a extended into a recess formed in the bottom or base of the bore 234 in the nut 226. The leg 308a is located about 180° around the circumference of the bore 234 from the recess into which the leg 306a of the top torsion spring 306 is extended. The bottom torsion spring 308 is curved through one or more convolutions which encircle the upper stem 312 segment, and ends in a leg portion 308b after being bent through an angle of 90°. The lug 307 also projects into the path of movement of the leg portion 308b when the bottom torsion spring 308 is rotated relative to the upper stem segment 312.

At a time when the valve is to be opened (in FIGS. 9-11 it is shown in its closed position), the handle 290 is manually grasped and rotated in a counterclockwise direction. As it does so, the nut 226 to which it is keyed (by reason of the polygonal opening through the handle and the mating configuration of the outer periphery of the nut at this location) also undergoes rotation in a counterclockwise direction. This movement causes the top torsion spring 306, including both the leg 306a and the leg portion 306b, to also move counterclockwise. This moves the leg portion 306b toward the right and away from the lug 307 as shown in FIG. 9. In other words, the packing nut 226 at this time rotates relative to the threaded portion 190 of the stem 14, and the relative movement is such that the stem and the gate 130 carried thereon are threaded upwardly relative to the valve body 120.

As the gate 130 moves upwardly relative to the valve body 120, the semispherical segments 150 and 152 are relieved from the wedging force which has previously been applied to these segments by the two pairs of parallel wedging-camming surfaces or legs 138, 140, 142 and 144. The segments 150 and 152 can collapse toward the gate, and the seals previously effected between these two segments and the annular seats 10 and 12 are relieved.

At about the time that the sealing forces against the segments 150 and 152 are relieved, the rotation of the handle 290 and the nut 226 has proceeded in a counterclockwise direction until the leg portion 308b of the bottom torsion spring 308 is brought into contact with the lug 307 carried on the upper stem segment 312. It will be recalled, of course, that the upper stem segment 312 is keyed to the main stem 14 by the extension of a polygonally cross-sectioned protuberant key 314 into a mating or complementary cavity formed in the upper end of the threaded portion 190 of the stem 14. Thus, at this time as the leg portion 308b moves in a counterclockwise direction with the nut 226 to which it is anchored or affixed by the extension of the leg 308a into a receiving aperture in the nut, the rotating handle 290 and nut 226 then commence to apply torque, through the bottom torsion spring 308 to the stem 14, through the upper stem segment 312.

The initial rotational movement of the operator handle 290 has caused only the upward movement of the stem 14 due to the engagement of the threads on the threaded portion 190 with the threads 228 carried on the inner surface of the bore 228 through the nut 226. This increment of rotation, however, will be through only a relatively small arc, and after this the stem 14 and gate 130 are caused to undergo rotation essentially in synchronism with the rotation of the handle 290 and the nut 226. This results from the force applied to the stem through the leg portion 308b of the bottom torsion spring 308 and the rotational interconnection between the upper stem segment 312 and the main stem 14.

Rotation of the handle 290 continues, along with continued rotation of the stem 14, until after traverse of 90° of rotation, a positive stop is encountered which prevents further rotation of the stem 14 and of the gate 130 which it carries. This mechanical stop can take many forms, but in the embodiment of the invention illustrated in FIG. 9 is in the form of a stop pin 318 projecting down from the lower side of the bonnet 128 into a cavity 320 which is curved through 90° and defines, at each of its opposite ends, a limit stop. The pin 318 will bear against one of the stops when the stem 14 and gate 130 are at the limits of their permissible rotation through the 90° increment of turning between a valve "open" and a valve "closed" position. In the action of the valve as it is being described, the 90° turn will be completed at a time when the valve has moved from the closed position shown in FIGS. 9 and 11 to an open position in which the bore 134 through the gate is aligned with the upstream fluid flow passageway 122 and the downstream fluid flow passageway 124. It will be understood from what has been described thus far, that after the sealing forces have been relieved from application to the segments 150 and 152, little resistance is offered to the rotation of the gate 130 and the segments 150 and 152 within the valve body.

When the stop prevents further rotation of the stem 14 and the gate 130, continued turning of the handle 290 past the point where the stop pin 318 has come against the end of the cavity 320 will cause a tightening of the bottom torsion spring 308. This tightening of the bottom torsion spring 308 will apprise an operator manually manipulating the handle 290 that the valve has been moved into the fully opened position, and the operator at this point will cease further turning of the handle 290.

When the valve is to be returned to the closed position, the rotation of the handle 290 is reversed and it is turned in a clockwise direction as it is viewed in FIG. 9. This will cause the handle 290, the nut 226 to move in a clockwise direction, and once the leg 306b of the top torsion spring 306 engages the lug 307, the stem segment 312, the stem 14 and the gate 130 rotate clockwise until, after moving through 90°, further rotational movements stem segment 312, the stem 14, the gate 130 and the segments 150 and 152 are arrested. Continued turning of the handle 290 causes the leg portion 308b to move away from the stud 307, relives torsion from the torsion spring 308, and causes the nut 226 to rotate relative to the stem 14 so as to drive the stem and gate downwardly by reason of the described threaded engagement. That is, in returning to the closed position, before the leg 306b of the top torsion spring 306 engages the lug 307 on the stem segment 312, the stem 14 moves downwards, but not enough to engage the wedging-camming surfaces on the gate segments. Once the leg 306b engages lug 307, the stem 14 begins to rotate 90° by transferring force from the nut 226 to the lug 307 through the top torsion spring 306. During the 90° rotation of the stem 14 in order to close the valve, the stem 14 does not move downward but rotates concurrently with the nut 226 in the same clockwise direction while the top torsion spring 306 continues to engage the lug 307. Once the stop pin 318 is contacted, further rotation of the nut 226 causes the stem 14 to move downward until such time that the wedging-camming surfaces come into contact thereby camming the segments out into sealing engagement. The leg 306b continues to engage the lug 307 and the extra rotation of the nut 226 beyond the 90° rotation of the gate 130 is absorbed in the top torsion spring 306 which gets wound up in torsion.

This downward movement will cause and replace with "The downward movement of the stem 14 causes" the gate 130 to wedge the segments 150 and 152 outwardly into valve closing sealing engagement as depicted in FIGS. 9–11. The continued rotation of the handle 290 and the nut 226 causes the leg portion 306b of the torsion spring 306 to bear against the lug 307. Further rotation will then resiliently load the torsion spring 306 so that an operator, in grasping the handle 290, is apprised that the valve is in the closed and sealed position.

Although a preferred embodiment of the invention has been herein described, it will be understood that various changes can be made in the described and illustrated structure without departure from the basic principles which underlie the invention. Changes and innovations of this type are therefor deemed to be circumscribed by the spirit and scope of the invention, except as the same may be necessarily limited by the appended claims, or reasonable equivalents thereof.

What is claimed is:

1. An expanding valve comprising:
   a valve body having a fluid flow passageway extending through the valve body and defining a fluid flow path through the valve body, the valve body defining a centrally located cavity in the fluid flow path;
   an annular valve seating surface disposed internally within the valve body adjacent the centrally located cavity and encircling the fluid flow passageway at one location therealong;
   an elongated stem including at least a portion located outside of the valve body and having a longitudinal axis extending transversely with respect to the axis of the fluid flow path;
   valve operator means, having a movable handle connected to the stem, for moving the stem solely when the valve operator means is moved, the valve operator means further characterized as comprising a lift-and-turn means connected to the valve stem and the gate for reciprocating the value stem and gate in a direction transverse with respect to the direction of fluid flow through the valve during a limited interval of movement of the handle, and for causing the valve stem and the gate to move with movement of the handle for rotation of the valve stem and the gate at a time of movement of the handle other than the limited interval, the lift-and-turn means comprising spring means resiliently interconnecting the handle and the valve stem;
   a gate connected to the stem and undergoing movement when the stem is moved by the valve operator means, the gate having an upstream face and a downstream face, a major portion of the gate located in the centrally located cavity within the valve body, the gate being reciprocably movable by the valve operator means in a direction transverse to the direction of the fluid flow path, the gate having two spaced apart, substantially parallel wedging-camming surfaces disposed on one of the gate faces facing toward the annular valve seating surface;

a floating segment movably mounted on the one gate face and having;
 a sealing face on one side facing toward the annular valve seating surface in the valve body; and
 a gate-contacting face on the opposite side thereof and contacting the gate face, the gate-contacting face defining two spaced apart, substantially parallel segment-carried wedging-camming surfaces, the segment-carried wedging-camming surfaces being spaced from each other and coacting with, mating with and extending substantially parallel to the wedging-camming surfaces carried on the gate face;

arresting means interposed in the path of movement of the floating segment for arresting movement of the floating segment and, by the wedging-camming action of the gate-carried wedging-camming surfaces against the segment-carried wedging-camming surfaces, for wedging the segment substantially parallel to, and toward, the annular valve seating surface in the valve body so that the floating segment is sealingly forced against the annular valve seating surface by movement of the floating segment away from the gate.

2. An expanding valve comprising:

a valve body having a fluid flow passageway extending through the valve body and defining a fluid flow path through the valve body, the valve body defining a centrally located cavity in the fluid flow path;

an annular valve seating surface disposed internally within the valve body adjacent the centrally located cavity and encircling the fluid flow passageway at one location therealong;

an elongated stem including at least a portion located outside of the valve body and having a longitudinal axis extending transversely with respect to the axis of the fluid flow path;

valve operator means having a movable handle connected to the stem for moving the stem solely when the valve operator means is moved, the valve operator means further characterized as comprising:
 lift-and-turn means connected to the valve stem and the gate for reciprocating the valve stem and gate in a direction transverse with respect to the direction of fluid flow through the valve during a limited interval of movement of the handle, and for causing the valve stem and the gate to move with movement of the handle for rotation of the valve stem and the gate at a time of movement of the handle other than the limited interval, the lift-and-turn means comprising:
 a first torsion spring having a first end connected to the handle and having a second end and a middle portion convoluted around the valve stem;
 a second torsion spring having a first end connected to the handle and having a second end and a middle portion convoluted around the valve stem in the opposite direction from the direction that the first torsion spring is convoluted around the valve stem;
 a valve stem thread carried on a part of the valve stem;
 threaded means connected to the handle, having a thread engaging the valve stem thread on the valve stem, for causing the valve stem to reciprocate along its axis when the handle is moved without concurrent rotation of the valve stem; and
 a stud on the valve stem positioned to be engaged at different times by the second ends of the first and second torsion springs as the handle is moved to cause the stem to periodically rotate in one direction concurrently with the movement of the handle, and then to rotate in the opposite direction concurrently with the movement of the handle while allowing the valve stem to be non-rotational during an increment of the movement of the handle in each of opposite directions of movement of the handle;

a gate connected to the stem and undergoing movement when the stem is moved by the valve operator means, the gate having an upstream face and a downstream face, a major portion of the gate located in the centrally located cavity within the valve body, the gate being reciprocably movable by the valve operator means in a direction transverse to the direction of the fluid flow path, the gate having two spaced apart, substantially parallel wedging-camming surfaces disposed on one of the gate faces facing toward the annular valve seating surface;

a floating segment movably mounted on the one gate face and having:
 a sealing face on one side facing toward the annular valve seating surface in the valve body; and
 a gate-contacting face on the opposite side thereof and contacting the gate face, the gate-contacting face defining two spaced apart, substantially parallel segment-carried wedging-camming surfaces, the segment-carried wedging-camming surfaces being spaced from each other and coacting with, mating with and extending substantially parallel to the wedging-camming surfaces carried on the gate face;

arresting means interposed in the path of movement of the floating segment for arresting movement of the floating segment and, by the wedging-camming action of the gate-carried wedging-camming surfaces against the segment-carried wedging-camming surfaces, for wedging the segment substantially parallel to, and toward, the annular valve seating surface in the valve body so that the floating segment is sealingly forced against the annular valve seating surface by movement of the floating segment away from the gate.

3. An expanding valve as defined in claim 2, wherein the sealing face on the segment is curved in a configuration complementary to the annular valve seating surface toward which the segment sealing face faces, and wherein the segment undergoes rotative movement with the gate when the gate undergoes rotation, while remaining movable relative to the gate in a direction perpendicular to the axis of the valve stem.

4. An expanding valve comprising:

a valve body having a fluid passageway extending through the valve body from one side thereof to the other side thereof, and defining a path of fluid flow through the valve body, the valve body defining a centrally located cavity therein located in the fluid passageway through the valve body;

a pair of spaced, opposed annular valve seating surfaces disposed internally within the valve body and facing each other in the valve body across the centrally located cavity, each of the annular valve seating surfaces extending around the fluid flow passageway at one location therealong, the annular valve seating surfaces being located at the opposite sides of the centrally located cavity defined within the valve body, the annular valve seating surfaces including:

an annular upstream seating surface; and
an annular downstream seating surface;

a valve stem having a longitudinal axis extending transversely with respect to the axis of fluid flow path through the valve along the fluid passageway;

valve operator means, connected to the valve stem and having a movable handle, for moving the valve stem when the valve operator means is moved, the valve operator means comprising a lift-and-turn means connected to the valve stem and the gate for reciprocating the valve stem and the gate in a direction transverse with respect to the direction of fluid flow through the valve during a limited interval of movement of the handle, and for causing the valve stem and the gate to move with movement of the handle for rotation of the valve stem and the gate at a time of movement of the handle other than the limited interval, the lift-and-turn means comprising spring means resiliently interconnecting the handle and the valve stem;

a gate connected to the valve stem for undergoing movement when the valve stem is moved, the gate having a portion located in the centrally located cavity between the annular valve seating surfaces, the gate being reciprocably movable in a direction transverse with respect to the fluid flow path, the gate having an upstream face and a downstream face and having two spaced apart, substantially parallel upstream wedging-camming surfaces on the upstream face, the gate having two additional spaced apart, substantially parallel, downstream wedging-camming surfaces located on the downstream face of the gate;

a first upstream floating segment movably mounted on the upstream face of the gate and having:

a first sealing face on one side of the first upstream floating segment facing toward the upstream annular valve seating surface; and a gate-contacting face on the opposite side of the first upstream floating segment from the first sealing face, the first upstream floating segment defining two spaced apart, substantially parallel wedging-camming surfaces on the gate-contacting face of the first upstream floating segment, the two wedging-camming surfaces on the first upstream floating segment coacting with, and moving against, the corresponding two spaced, substantially parallel, upstream wedging-camming surfaces on the upstream face of the gate so that when the gate is moved relative to the first upstream floating segment in one direction, the first upstream floating segment is wedged toward the upstream annular valve seating surface, forcing the first upstream floating segment sealingly against the annular upstream valve seating surface by movement of the first floating upstream segment so that the first sealing face remains substantially parallel to the upstream annular valve seating surface in the valve body during its movement toward the upstream annular valve seating surface;

a second downstream floating segment movably mounted on the downstream face of the gate and having a second sealing face and a gate-contacting face on the opposite side of the second downstream floating segment from the second sealing face, the second downstream floating segment defining two spaced apart, substantially parallel, wedging-camming surfaces on the gate-containing face thereof, the wedging-camming surfaces carried on the gate-contacting face of the second downstream floating segment coacting with, and moving against, the two wedging-camming surfaces carried on the down-stream face of the gate so that when the gate and the second downstream floating segment move relative to each other, the second downstream floating segment is wedged toward the downstream annular seating surface, and the second sealing face of the second downstream floating segment seals against the downstream annular valve seating surface by movement of the second downstream floating segment so that the second sealing face of the second downstream segment remains substantially parallel to the downstream annular valve seating surface during its movement toward the downstream annular valve seating surface;

means positioned in the valve body for interrupting movement of the floating segments while the gate continues to move so that the floating segments will be caused to expand outwardly away from the gate due to the interaction of the wedging-camming surfaces carried on the gate with the wedging-camming surfaces carried on the floating segments.

5. An expanding valve comprising:

a valve body having a fluid passageway extending through the valve body from one side thereof to the other side thereof, and defining a path of fluid flow through the valve body, the valve body defining a centrally located cavity therein located in the fluid passageway through the valve body;

a pair of spaced, opposed annular valve seating surfaces disposed internally within the valve body and facing each other in the valve body across the centrally located cavity, each of the annular valve seating surfaces extending around the fluid flow passageway at one location therealong, the annular valve seating surfaces being located at the opposite sides of the centrally located cavity defined within the valve body, the annular valve seating surfaces including:

an annular upstream seating surface; and
an annular downstream seating surface;

a valve stem having a longitudinal axis extending transversely with respect to the axis of fluid flow path through the valve along the fluid passageway;

valve operator means, connected to the valve stem and having a movable handle, for moving the valve stem when the valve operator means is moved, the valve operator means further comprising a lift-and-turn means connected to the valve stem and the gate for reciprocating the valve stem and the gate in a direction transverse with respect to the direction of fluid flow through the valve during a limited interval of movement of the handle, and for causing the valve stem and the gate to move with movement of the handle for rotation of the valve stem and the gate at a time of movement of the handle other than the limited interval, the lift-and-turn means comprising:

a first torsion spring having a first end connected to the handle and having a second end and a middle portion convoluted around the valve stem;

a second torsion spring having a first end connected to the handle and having a second end and middle portion convoluted around the valve stem in the opposite direction from the direction that the first torsion spring is convoluted around the valve stem;

a thread carried on a part of the valve stem;

threaded means connected to the handle for rotation and having a thread engaging the thread on a part of the valve stem for causing the valve stem to reciprocate along its axis when the handle is moved without concurrent rotation of the valve stem; and a stud on the valve stem positioned to be engaged at different times by the second ends of the first and second torsion springs as the handle is moved to cause the stem to periodically rotate in one direction concurrently with movement of the handle, and then to rotate in the opposite direction concurrently with the movement of the handle while allowing the valve stem to be non-rotational during an increment of the movement of the handle in each of opposite directions of movement of the handle;

a gate connected to the valve stem for undergoing movement when the valve stem is moved, the gate having a portion located in the centrally located cavity between the annular valve seating surfaces, the gate being reciprocably movable in a direction transverse with respect to the fluid flow path, the gate having an upstream face and a downstream face and having two spaced apart, substantially parallel upstream wedging-camming surfaces on the upstream face, the gate having two additional spaced apart, substantially parallel, downstream wedging-camming surfaces located on the downstream face of the gate;

a first upstream floating segment movably mounted on the upstream face of the gate and having:

a first sealing face on one side of the first upstream floating segment facing toward the upstream annular valve seating surface; and a gate-contacting face on the opposite side of the first upstream floating segment from the first sealing face, the first upstream floating segment defining two spaced apart, substantially parallel wedging-camming surfaces on the gate-contacting face of the first upstream floating segment, the two wedging-camming surfaces on the first upstream floating segment coacting with, and moving against, the corresponding two spaced, substantially parallel, upstream wedging-camming surfaces on the upstream face of the gate so that when the gate is moved relative to the first upstream floating segment in one direction, the first upstream floating segment is wedged toward the upstream annular valve seating surface, forcing the first upstream floating segment sealingly against the annular upstream valve seating surface by movement of the first floating upstream segment so that the first sealing face remains substantially parallel to the upstream annular valve seating surface in the valve body during its movement toward the upstream annular valve seating surface;

a second downstream floating segment movably mounted on the downstream face of the gate and having a second sealing face and a gate-contacting face on the opposite side of the second downstream floating segment from the second sealing face, the second downstream floating segment defining two spaced apart, substantially parallel, wedging-camming surfaces on the gate-contacting face thereof, the wedging-camming surfaces carried on the gate-contacting face of the second downstream floating segment coacting with, and moving against, the two wedging-camming surfaces carried on the downstream face of the gate so that when the gate and the second downstream floating segment move relative to each other, the second downstream floating segment is wedged toward the downstream annular seating surface, and the second sealing face of the second downstream floating segment seals against the downstream annular valve seating surface by movement of the second downstream floating segment so that the second sealing face of the second downstream segment remains substantially parallel to the downstream annular valve seating surface during its movement toward the downstream annular valve seating surface;

means positioned in the valve body for interrupting movement of the floating segment while the gate continues to move so that the floating segments will be caused to expand outwardly away from the gate due to the interaction of the wedging-camming surfaces carried on the gate with the wedging-camming surfaces carried on the floating segments.

6. An expanding valve as defined in claim 5, wherein the sealing face on each of the segments is curved in a configuration complementary to the annular valve seating surface toward which the respective segment sealing face faces, and wherein each of the segments undergoes rotative movement with the gate when the gate undergoes rotation, while remaining movable relative to the gate in a direction perpendicular to the axis of the valve stem.

7. An expanding valve comprising:

a valve body having a fluid passageway extending through the valve body from one side thereof to the other side thereof, and defining a path of fluid flow through the valve body, the valve body defining a centrally located cavity located in the fluid flow passageway;

a bonnet secured to the valve body over the cavity;

a pair of spaced, opposed, annular valve seating surfaces within the valve body and facing each other across the centrally located cavity, each of the annular valve seating surfaces extending around the fluid flow passageway at one location therealong, the annular valve seating surfaces being located at the opposite sides of the central located cavity, the annular valve seating surfaces including:

an upstream annular valve seating surface; and a downstream annular valve seating surface;

a valve stem extending through the bonnet and having a longitudinal axis extending transversely with respect to the fluid flow path;

a valve operator handle movably mounted on the bonnet;

a gate connected to the valve stem for undergoing movement when the valve stem is moved by movement of the valve operator handle, the gate having a major portion located in the centrally located cavity between the upstream and downstream annular valve seating surfaces, the gate being reciprocably movable in a direction transverse to the fluid flow path, the gate having an upstream face and a downstream face, and having two spaced apart, substantially parallel, upstream wedging-camming surfaces located on the upstream face, the gate having two spaced apart, substantially parallel, downstream wedging-camming surfaces located on the downstream face of the gate;

a first upstream floating segment movably disposed on the upstream face of the gate and having:
  a sealing face on one side of the upstream floating segment facing toward the upstream annular valve seating surface; and
  a gate-contacting face on the opposite side of the first upstream floating segment from the sealing face, the upstream floating segment defining two spaced apart, substantially parallel, wedging-camming surfaces on the gate-contacting face of the upstream floating segment, the two spaced, wedging-camming surfaces carried on the first upstream floating segment coacting with, and moving against, the corresponding two spaced, substantially parallel, upstream wedging-camming surfaces carried on the upstream face of the gate so that when the gate is moved relative to the first upstream floating segment in one direction, the wedging-camming surfaces on the gate wedge the first upstream floating segment toward the upstream annular valve seating surface, forcing the first upstream floating segment sealingly against the upstream annular valve seating surface by movement of the first upstream floating segment so that the sealing face of the first upstream floating segment remains substantially parallel to the upstream annular valve seating surface in the valve body during its movement toward the upstream seating surface;

a second downstream floating segment movably mounted on the downstream face of the gate and having:
  a sealing face on one side of the downstream floating segment facing toward the downstream seating surface; and
  a gate-contacting face on the opposite side of the second downstream floating segment from the last-mentioned sealing face, the second downstream floating segment defining two spaced apart, substantially parallel, wedging-camming surfaces on the gate-contacting face thereof, the wedging-camming surfaces carried on the gate-contacting face of the second down-stream floating segment coacting with and moving against, the two spaced, substantially parallel, wedging-camming surfaces carried on the downstream face of the gate so that when the gate and the second downstream floating segment move relative to each other, the second downstream floating segment is wedged toward the downstream annular valve seating surface, and the sealing face of the second downstream floating segment seals against the downstream annular valve seating surface by movement of the second downstream floating segment so that the sealing face of the second downstream floating segment moves substantially parallel to the downstream annular valve seating surface in the valve body during its movement toward the downstream annular valve seating surface;

means positioned in the valve body for interrupting movement of the floating segments while the gate continues to move so that the floating segments will be caused to expand outwardly away from the gate due to the interaction of the wedging-camming surfaces carried on the gate with the wedging-camming surfaces carried on the floating segments; and a lift-and-turn means connected between the operator handle and the valve stem for permitting movement of the valve stem and the gate by the valve stem only when the handle is moved, the lift-and-turn means reciprocating the stem and gate in a direction transverse to the direction of fluid flow during a limited interval of the movement of the handle, and the lift-and-turn means causing the stem and gate to rotate with movement of the handle at a time of movement of the handle other than the limited interval, the lift-and-turn means comprising spring means resiliently interconnecting the handle and the valve stem.

8. An expanding valve as defined in claim 7 wherein the spring means comprises:
  a first torsion spring having a first end connected to the handle, and a second end and a middle portion convoluted around the valve stem;
  a second torsion spring having a first end connected to the handle, and a second end and a middle portion convoluted around the valve stem in the opposite direction from the direction that the first torsion spring is convoluted around the stem;
  a value stem thread carried on a part of the value stem;
  threaded means connected to the handle, having a thread engaging the valve stem thread on the valve stem, for causing the valve stem to reciprocate along its axis when the handle is moved without concurrent rotation of the valve stem; and
  a stud on the stem positioned to be engaged at different times by the second ends of the first and second torsion springs as the handle is moved to cause the stem to periodically rotate in one direction concurrently with movement of the handle, and then to rotate in the opposite direction concurrently with movement of the handle while allowing the stem to be non-rotatable during an increment of the movement of the handle in each of opposite directions of movement of the handle.

* * * * *